S. W. SHANKS.
HOE.
APPLICATION FILED MAY 27, 1908.
917,670.
Patented Apr. 6, 1909.
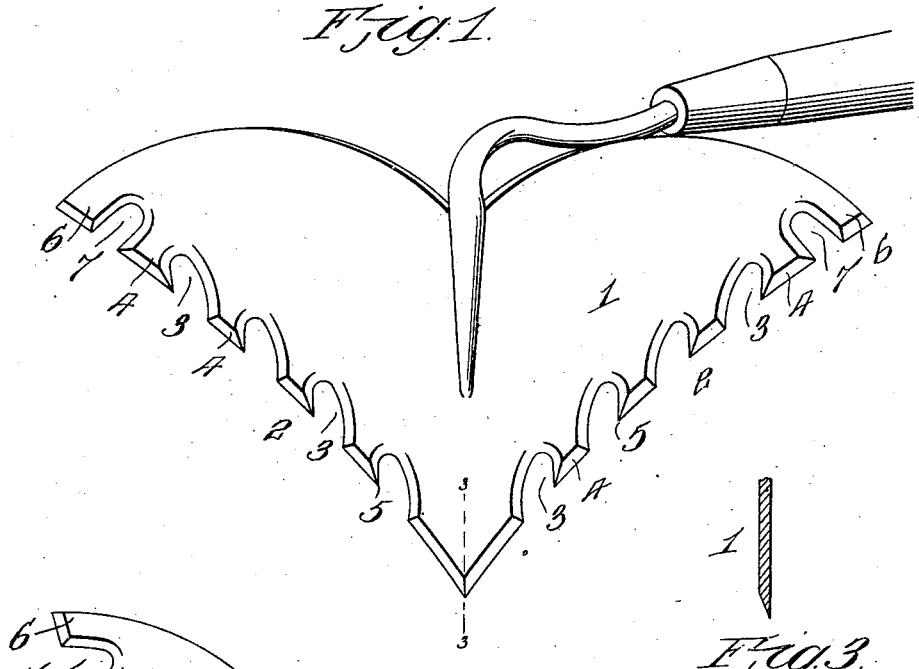
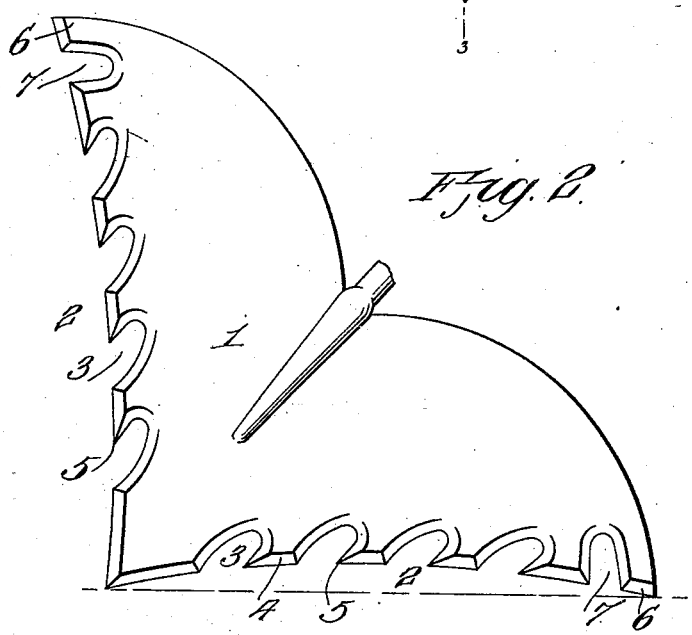

UNITED STATES PATENT OFFICE.

SIMON W. SHANKS, OF BENTON HARBOR, MICHIGAN.

HOE.

No. 917,670.  Specification of Letters Patent.  Patented April 6, 1909.

Application filed May 27, 1908. Serial No. 435,317.

*To all whom it may concern:*

Be it known that I, SIMON W. SHANKS, a citizen of the United States, residing at Benton Harbor, in the county of Berrien and State of Michigan, have invented new and useful Improvements in Hoes, of which the following is a specification.

This invention relates to hoes, and it has for its object to simplify and improve the construction and operation of this class of devices, and is especially designed as an improvement upon my patented device No. 880,925, dated March 3, 1908.

With these and other objects in view, which will appear as the nature of the invention is better understood, the same consists essentially in a hoe blade of a triangular shape having its sides extending from its apex to its top curved inwardly and sharpened to provide cutting edges, the sides or cutting edges being provided with spaced depressions also sharpened and for the purpose of facilitating the operation and increasing the efficiency of the hoe.

Another object of the invention is to provide these depressions with a hooked edge and to have the upper cutting face provided by the depressions at a greater arch than the remainder of the cutting faces whereby this portion of the hoe may be especially adapted for removing weeds growing close to plants without danger of injury to the plants.

With these objects in view the invention consists in the improved construction and arrangement of parts which will be hereinafter fully described and particularly pointed out in the claim.

In the accompanying drawings, there has been shown a simple and preferred form of the invention, it being, however, understood, that no limitation is necessarily made to the precise structural details therein exhibited, but that further changes, alterations and modifications within the scope of the invention may be resorted to when desired.

In the drawings, Figure 1 is a perspective view of a hoe constructed in accordance with the present invention. Fig. 2 is a front elevation of the same. Fig. 3 is a sectional detail taken on the plane indicated by the line 3—3 of Fig. 2. Fig. 4 is a partial side elevation.

Corresponding parts in the several figures are denoted by like characters of reference.

The blade 1 of the hoe comprises a triangular member which may have its top edge centrally provided with a rearwardly extending shank to which may be secured a handle by which the blade is manipulated. The inclined sides 2 of the hoe are of an inwardly curved or arcuate formation, and the edges of these sides 2 are beveled or sharpened to provide cutting edges. The sides 2 are each provided with a plurality of depressions or cut away portions 3, curved inwardly upon the face of the hoe and beveled to also provide cutting edges. By this construction it will be noted that the apex of the hoe presents a sharpened tooth which may be readily inserted within the earth and that the cutting faces or teeth 5 provided by the cut away portions 3, as well as the knife faces provided upon the edges of the cut away portions allow the hoe blade to be easily manipulated beneath the surface of the earth and to sever the roots of weeds or other obnoxious plants with which it contacts. The beveled or sharpened portions of the cut away parts 3 communicating with the beveled or sharpened portions of the teeth 4 present a substantial hook 5 at their points of connection, and these hooks 5 may be employed for grasping plants or weeds and readily removing the same from the ground. The uppermost tooth 6 provided upon each of the sides of the hoe has its cut away portion 7, by which it is removed from the next tooth 4 struck at a greater arc than the remainder of the cut away portions, and by this arrangement it will be noted that the tooth 7 is positioned at nearly a right angle from the handle of the hoe so that this tooth 6 may be effectively employed for removing weeds growing close to a plant without danger of injury to the plant.

From the above description it will be noted that the improved hoe is extremely simple in construction and that by the peculiar formation the entrance of the blade into the soil is facilitated and that the sides are adapted to work with a cutting and shearing action which greatly facilitates the operation and efficiency of the device. It will be further noted that the blade may be also manipulated by its handle to drag along the ground adjacent to a row of growing plants and that it may be permitted to enter the soil to any desired depth, so that the soil loosened thereby will be thrown in the direction of the roots of the plants which will thus be covered with fresh loose soil thus promoting the vigorous and successful growth of the plants.

The improved hoe will be found thoroughly useful and efficient for the purposes for which it is provided.

Having thus fully described the invention what is claimed as new is:

A triangular hoe having two of its sides of an inward arcuate formation and sharpened to provide cutting edges, the cutting edges of the hoe being also provided with spaced depressions having sharpened edges to provide cutting members and the uppermost cutting edge provided by the said depressions being arranged at a substantially right angle in relation to a central vertical line of the hoe.

In testimony whereof I affix my signature in presence of two witnesses.

SIMON W. SHANKS.

Witnesses:
ADALINE K. SHANKS,
NORAH M. KOOP.